2 Sheets—Sheet 1.

L. MARTIN.
Machine for Exterminating Noxious Grasses.

No. 203,172. Patented April 30, 1878.

Attest:
R. E. White
Edwin Scott

Inventor.
Louis Martin
by R. F. Osgood,
Atty.

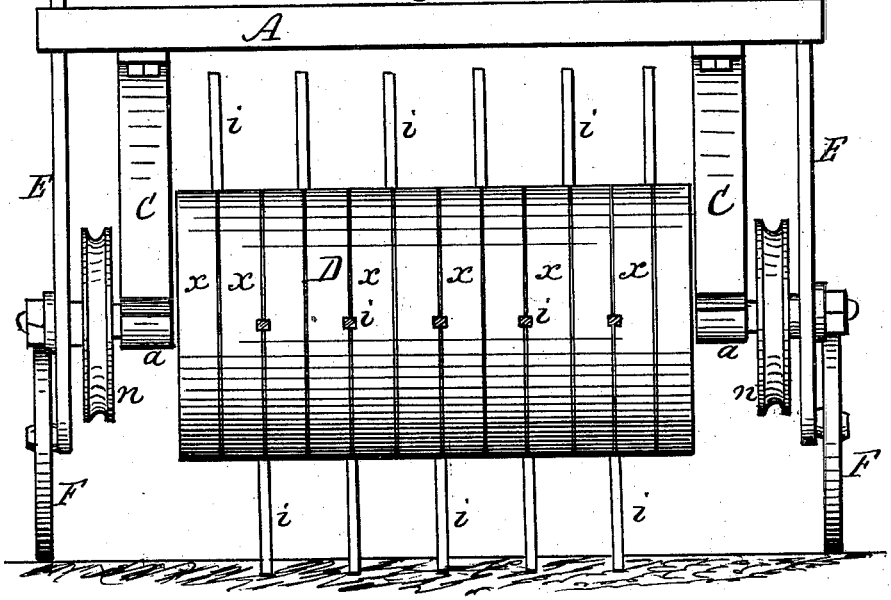
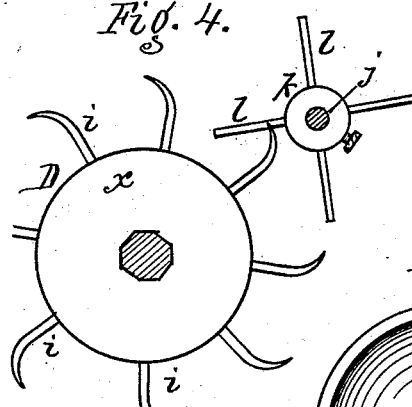
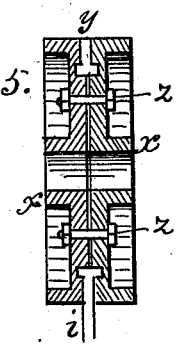
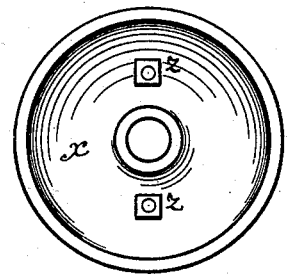
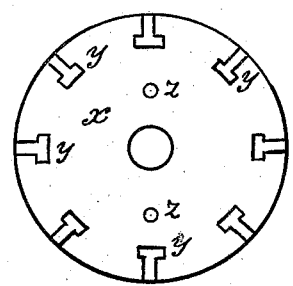

UNITED STATES PATENT OFFICE.

LOUIS MARTIN, OF LYONS, NEW YORK.

IMPROVEMENT IN MACHINES FOR EXTERMINATING NOXIOUS GRASSES.

Specification forming part of Letters Patent No. 203,172, dated April 30, 1878; application filed January 2, 1878.

*To all whom it may concern:*

Be it known that I, LOUIS MARTIN, of Lyons, in the county of Wayne and State of New York, have invented a certain new and useful Improvement in Machines for Exterminating Noxious Grasses; and I do hereby declare that the following is a full, clear, and exact description of the construction and operation of the same, reference being had to the accompanying drawings, in which—

Figure 1:
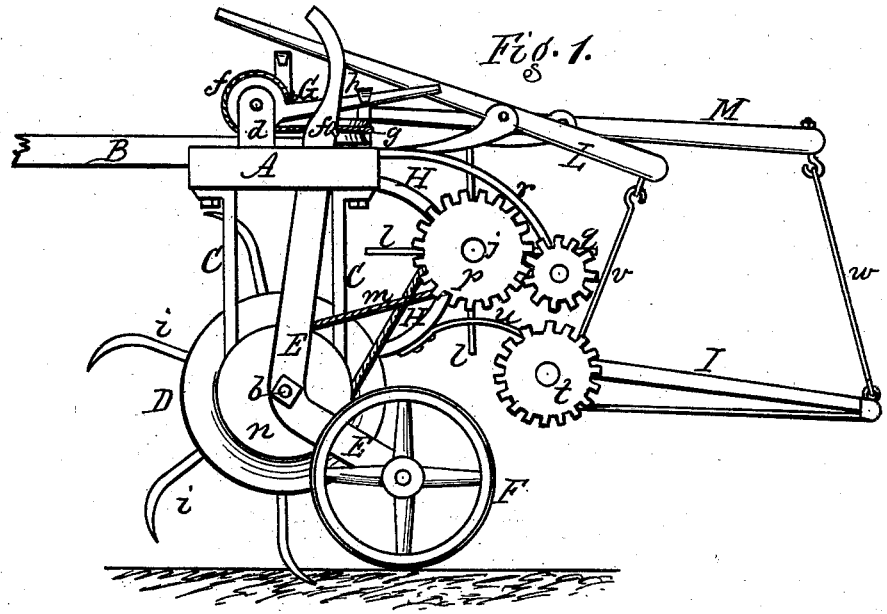
Figure 2:
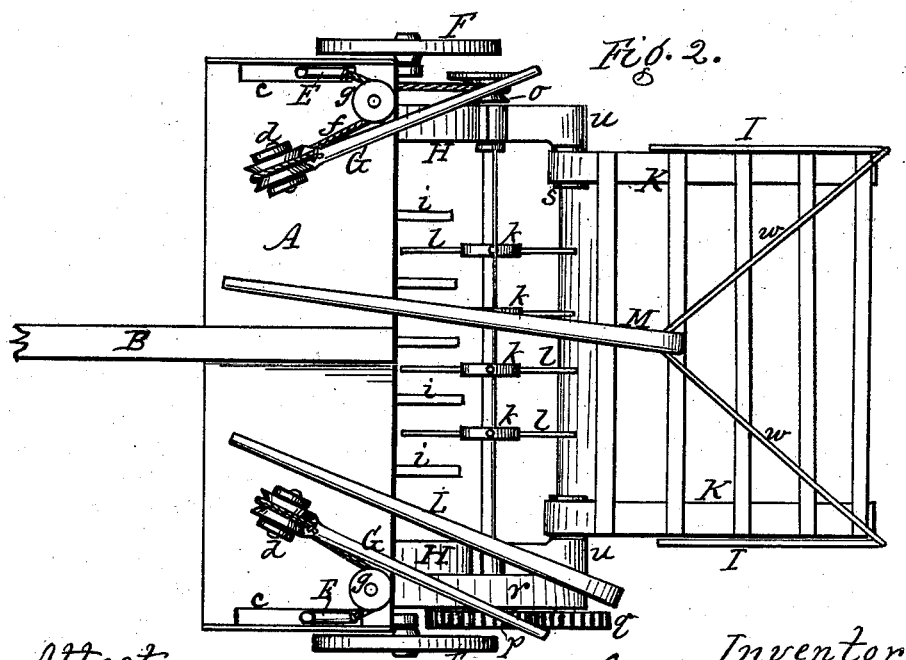

Figure 1 is a side elevation. Fig. 2 is a plan. Fig. 3 is a rear elevation. Figs. 4, 5, 6, and 7 are detail views.

My improvement relates to machines for exterminating noxious grasses in which a cylinder armed with teeth is employed, the teeth entering the ground and pulling out the grass by the roots.

The invention consists in the construction and arrangement of parts, hereinafter more fully described and definitely claimed.

A is a rectangular frame, upon which is mounted a driver's seat, and which is provided with a pole or tongue, B, by which the machine is drawn. C C are two hangers at opposite ends of the frame, made in the form of loops, and bolted to the frame, and provided at the bottom with boxes $a\ a$, in which rests the shaft of the cylinder D. E E are levers at the opposite ends of the machine, pivoted at $b$ on the axis of the cylinder, the lower ends being bent outward or backward, and having supporting-wheels F F, while their upper ends pass up through guideways $c\ c$ of the main frame. By throwing these levers one way or the other the cylinder D, together with the main frame and the other parts, will be correspondingly raised or lowered, thereby varying the depth of cut of the cylinder-teeth, or throwing said teeth entirely out of the ground, which is necessary in going into the field. G G are cam-levers, mounted in bearings $d\ d$ on top of the main frame. Cords or chains $f f$ are attached to the heads of these levers, and extend thence around pulleys $g\ g$, and are attached to the levers E E, as clearly shown in Figs. 1 and 2. The cam-levers G G, as well as the hand-levers E E, are within reach of the driver, and by seizing them he can at any time elevate the cylinder, so as to run it clear of obstructions or grade the cut; and by engaging the cam-levers with suitable catches $h\ h$, he can retain the cylinder in an elevated position any desired length of time. The cylinder is provided with hooking teeth $i\ i$, which strike into the ground and tear up the roots of the grass. H H are bearings in the form of a bow, which are attached to the hangers C C, and project backward. These bearings are provided with boxes, which hold the shaft $j$. On this shaft are a series of heads, $k\ k$, having teeth $l\ l$ cast in, said teeth passing between the digging-teeth of the cylinder, and forming clearers for clearing the cylinder of the grass as it is thrown up. The clearers may run in either direction desired, but preferably upward. The heads or disks of the clearers may have hubs, which abut to keep them in place and stiffen the shaft. The clearer-shaft is driven by a chain or band, $m$, at each end, which passes around a pulley, $n$, of the cylinder-shaft and a smaller pulley, $o$, of the clearer-shaft. The chain or band may be crossed or not, according to the direction the clearers are to run. $p$ is a cog-wheel on one end of the clearer-shaft. $q$ is a pinion, which gears with it, being attached to a bearing, $r$. I is a platform in the rear of the machine, having an endless apron, K, which passes over pulleys $s\ s$ at the inner and outer ends. On the shaft of the inner pulleys is attached a spur-gear, $t$, which, in its normal position, is out of engagement with the pinion $q$, in which case the endless apron is stationary. The inner end of the platform is attached to springs $u\ u$, so that it may be raised and lowered, said springs being bolted to the bearings H H, as shown in Fig. 1. L is a lever, pivoted to the main frame, and $v$ is a connection between the outer end of the lever and the spring $u$.

When the lever is pressed down the spring is elevated, and the spur-gear $t$ is then brought into engagement with the pinion $q$, and motion is imparted to the endless apron, to discharge the grass that is thrown upon it by the cylinder-teeth. By this means a quantity of the grass can be collected on the platform and then thrown off in a heap.

The outer end of the platform is controlled by a lever, M, with two branching connections, $w\ w$, which extend to the outer corners of the platform, thus leaving free space for the discharge of the grass. By this means the inclination of the platform and endless apron may be varied to meet the requirements of the work.

In some cases the grass may be made to slide over the platform without running the apron, if set at proper inclination.

The cylinder D is composed of a series of disks or rings, $x\ x$, which are placed upon the shaft, and clamped together by nuts at each end, or by keys or other suitable means. These rings are fastened together in pairs, as shown in Fig. 5, by means of bolts $z\ z$, clamping the teeth $i\ i$ between them. For this purpose sockets $y\ y$, with cross-heads or enlargements at their inner end, are formed in the plane faces of the rings, as shown in Fig. 7, and the teeth are formed with corresponding cross-heads or enlargements at their ends, which fit in these sockets, and when the two rings are clamped together the teeth cannot escape. This is a convenient way of attaching the teeth, as they are easily replaced if broken, and it enables them to be removed for sharpening or repairs. They might be cast solid in the rings, but would not be so effective.

Fig. 6 shows an outside view, and Fig. 7 an inside view, of one of the rings. The shaft on which the rings rest may be round, square, or of other form in cross-section; but it is preferably so arranged that when the rings are placed thereon the teeth shall stand in spiral or angular order around the cylinder, to bring a succession of cutting-points into the earth.

The machine above described is also effective as a pulverizer.

I claim—

1. In a machine for exterminating noxious grasses, the cylinder D, constructed of rings or disks $x\ x$, resting upon the shaft and clamped at the ends, the said rings or disks being bolted together in pairs, and securing the teeth $i\ i$ between them, as shown and described, and for the purpose specified.

2. The disks or rings $x\ x$, having plane abutting faces, clamped together in pairs by the bolts $z\ z$, and provided with the sockets $y\ y$, enlarged at their inner ends to receive and hold the corresponding shanks of the teeth $i\ i$, as shown and described, and for the purpose specified.

3. The combination, with the cylinder D and clearers $l\ l$, of the platform I and endless apron K, the platform being attached to the springs $u\ u$ at the inner end, and adjustable both at the inner and outer ends by the levers L M, as shown and described, and for the purpose specified.

In witness whereof I have hereunto signed my name in the presence of two subscribing witnesses.

LOUIS MARTIN.

Witnesses:
   R. F. OSGOOD,
   J. N. COLE.